Patented Mar. 29, 1949

2,465,547

UNITED STATES PATENT OFFICE 2,465,547

HEXADECAMETHYLCYCLOOCTASILOXANE

Rob Roy McGregor, Verona, and Earl Leathen Warrick, Pittsburgh, Pa., assignors, by mesne assignments, to Corning Glass Works, Corning, N. Y., a corporation of New York No Drawing. Application March 12, 1948, Serial No. 14,633

1 Claim. (Cl. 260—448.2)

This invention relates to polymers of dimethyl siloxane. It is particularly concerned with hexadecamethylcyclooctasiloxane.

This application is in part a continuation of our copending application Serial Number 490,348, filed June 10, 1943, now Patent Number 2,439,856, which is in part a continuation of our application Serial Number 432,530, filed February 26, 1942, now issued as Patent Number 2,384,384, both of which disclose the subject matter herein claimed.

We have disclosed dimethylsiloxanes in our prior applications. These materials in general are fluids and solids of the polymeric structure

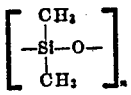

Objects of the present invention are the provision of crystalline dimethylsiloxane and in particular of a dimethylsiloxane which has piezoelectric properties.

The dimethylsiloxane in accordance with our present invention is hexadecamethylcyclooctasiloxane, which is the cyclic octamer of dimethylsiloxane. This is a crystalline solid at room temperature, which is distinct from the crystalline cyclic trimer of dimethylsiloxane in that the ring structure of the latter is under strain, and that the latter does not possess piezoelectric properties.

The cyclic octamer hereof may be produced in a variety of ways. Thus, it is produced in the acid catalyzed hydrolysis of dimethyldiethoxysilane or dimethyldichlorosilane. The product hereof may be separated from the condensed hydrolysate by distillation. Likewise it may be produced by the cracking of said hydrolysate by heating at a temperature above 100° C., preferably in the presence of a minor amount of an alkali metal hydroxide or in a stream of steam or both.

The production of the product hereof is illustrated by the following example:

*Example.*—One volume of dimethyldiethoxysilane is mixed with one volume of a mixture of 95% ethyl alcohol and concentrated aqueous hydrochloric acid in equal parts. The reaction mixture is refluxed for about four to eight hours after which it is poured into water and the product separates. The oily layer is washed free from acid and alcohol and is thereafter dried by treating the liquid at room temperature with anhydrous sodium sulfate. The liquid which results has a viscosity of about 100 Saybolt seconds at 25° C.

The liquid is heated to 250° C. at 4 millimeters pressure whereby low polymers are distilled off and collected. These polymers comprise, for the most part, cyclic polymers of dimethylsiloxane having up to 13 silicon atoms per molecule. The mixture of low polymers is refluxed for two to five hours with 20% hydrochloric acid and afterwards is washed free of acid. The cyclic dimethylsiloxanes are then separated from the mixture by fractional distillation.

Hexadecamethylcyclooctasiloxane is obtained as that portion of the mixture distilling at 97° C. at 0.5 millimeter absolute pressure. It is a water white crystalline compound having a melting point of 30° C. It has an index of refraction at 25° C. of 1.4039, and a flash point of 270° F. The crystals are of columnar habit and have piezoelectric properties.

In the table is given the viscosity in centistokes of fused hexadecamethyloctasiloxane at several different temperatures.

Table

| Temperature, ° C. | Viscosity, centistokes |
| --- | --- |
| 25 | [1] 13.23 |
| 50 | 7.7 |
| 75 | 4.6 |
| 100 | 3.3 |
| 145 | 1.7 |

[1] Supercooled.

Hexadecamethylcyclooctasiloxane is completely dehydrated, and accordingly is not easily polymerized by heat alone. It is oxidized only with difficulty.

Hexadecamethylcyclooctasiloxane is of particular utility because of its piezoelectric properties.

That which is claimed is:

Hexadecamethylcyclooctasiloxane.

ROB ROY McGREGOR.
EARL LEATHEN WARRICK.

No references cited.